(12) United States Patent
Oberle et al.

(10) Patent No.: US 7,839,037 B2
(45) Date of Patent: Nov. 23, 2010

(54) ELECTRIC MOTOR HOUSING WITH TRANSMISSION DRIVE UNIT INTERFACE

(75) Inventors: Hans-Juergen Oberle, Rastatt (DE); Dieter Scheer, Buehlertal (DE); Franz Schwendemann, Ottersweier (DE); Christof Bernauer, Hundsbach (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 11/917,071

(22) PCT Filed: May 17, 2006

(86) PCT No.: PCT/EP2006/062373

§ 371 (c)(1),
(2), (4) Date: Dec. 10, 2007

(87) PCT Pub. No.: WO2007/000378

PCT Pub. Date: Jan. 4, 2007

(65) Prior Publication Data

US 2008/0197733 A1 Aug. 21, 2008

(30) Foreign Application Priority Data

Jun. 29, 2005 (DE) .................. 10 2005 030 217

(51) Int. Cl.
| H02K 5/00 | (2006.01) |
| H02K 5/04 | (2006.01) |
| H02K 5/16 | (2006.01) |
| H02K 5/26 | (2006.01) |
| H02K 7/14 | (2006.01) |
| H02K 7/116 | (2006.01) |

(52) U.S. Cl. .................. 310/89; 310/75 R; 310/83; 310/90; 310/91; 310/98; 310/99; 310/154.08; 310/40 MM

(58) Field of Classification Search .................. 310/89, 310/51, 75 R, 83, 90, 91, 98, 99, 154.08, 310/40 MM; 174/50, 520; 74/425; H02K 5/00, H02K 5/04, 5/16, 5/26, 7/14, 7/116

See application file for complete search history.

(56) References Cited

U.S. PATENT DOCUMENTS

| 4,283,645 | A | | 8/1981 | Hofmann |
| 5,117,138 | A | * | 5/1992 | Trian ........................ 310/89 |
| 5,803,427 | A | * | 9/1998 | Huang ...................... 248/674 |
| 6,288,464 | B1 | * | 9/2001 | Torii et al. ................... 310/78 |
| 6,639,335 | B1 | * | 10/2003 | Lauk et al. .................... 310/89 |

(Continued)

FOREIGN PATENT DOCUMENTS

CN  1347476  5/2002

(Continued)

*Primary Examiner*—Quyen Leung
*Assistant Examiner*—Michael Andrews
(74) *Attorney, Agent, or Firm*—Michael J. Striker

(57) ABSTRACT

An electric motor for actuators in a motor vehicle has an armature shaft, which is supported in a pole housing that includes a jacket and a bearing cover on at least on one end face for accommodating a bearing for the armature shaft, and at least one radial recess is formed in the pole housing, which, once the pole housing has been fully assembled, is suitable for engagement by at least one radial fastening segment of a transmission interface in the pole housing, in order to attach the electric motor to the transmission interface.

22 Claims, 4 Drawing Sheets

U.S. PATENT DOCUMENTS

| | | | |
|---|---|---|---|
| 6,713,913 B1 * | 3/2004 | Hager et al. | 310/89 |
| 6,897,580 B2 * | 5/2005 | White | 310/51 |

FOREIGN PATENT DOCUMENTS

| | | |
|---|---|---|
| DE | 1 895 968 | 7/1964 |
| DE | 41 16 791 | 11/1992 |
| DE | 100 19 512 | 8/2001 |
| DE | 103 32 757 | 2/2005 |
| EP | 0 082 375 | 6/1983 |
| EP | 0 177 001 | 4/1986 |
| EP | 1 184 958 | 3/2002 |
| FR | 2 358 583 | 2/1978 |
| FR | 2 533 084 | 3/1984 |
| GB | 1 450 447 | 9/1976 |
| WO | 2005/109607 | 11/2005 |
| WO | WO 2005109607 A1 * | 11/2005 |
| WO | 2007/000378 | 1/2007 |

* cited by examiner

ELECTRIC MOTOR HOUSING WITH TRANSMISSION DRIVE UNIT INTERFACE

CROSS-REFERENCE TO RELATED APPLICATION

The invention described and claimed hereinbelow is also described in German Patent Application DE 10 2005 030 217.3 filed on Jun 29, 2005. This German Patent Application provides the basis for a claim of priority of invention under 35 U.S.C. 119(a)-(d).

BACKGROUND OF THE INVENTION

The present invention relates to an electric motor and a transmission drive unit for use in adjustment devices in a motor vehicle.

Publication DE 100 19 512 A1 makes known a power window drive, the housing of which includes a pole pot and a housing that closes the pole pot. The housing that closes the pole pot is a transmission housing with an integrated electronics housing. A separate component—as a brush holder—is located between the two housing parts, and also serves as a seal between the two housing parts. The pole pot is composed of a deep-drawn, flattened cylindrical tube, on the open end of which a flange is integrally formed, in which holes are formed for receiving screws. Blind threads are formed in the flange of the transmission housing, into which the screws are turned, thereby fixedly connecting the two housing parts with each other. More recesses are formed in the flange of the pole pot than are required for the connection with a transmission housing. A pole pot of this type is therefore suited for connection with different transmission housings with various counter-recesses, although the electric motor must always be installed and secured axially in the transmission housing. For this reason, the open electric motor that is used is not suited for use without a transmission housing.

SUMMARY OF THE INVENTION

The inventive electric motor and the inventive transmission drive unit have the advantage that, due to the formation of the radial recess in the pole housing, it is possible to manufacture a very simple, installable connection of an electric motor with a customer-specific transmission interface in a very cost-favorable manner. The pole housing may always be manufactured in a uniform manner, and it may be combined, in a modular system, with different transmission housings, transmission interfaces, adapter elements, or fastening flanges. The radial recesses may be fabricated in a uniform manner world-wide using simple standard processes without the need to use additional material. When the electric motor is installed radially in a two-shelled transmission housing, the electric motor is fixed in position securely with the transmission housing by the fact that fastening segments integrally formed on the transmission interface engage in the radial recesses. The bearing cover reliably closes the pole housing, so that the electric motor may be used universally, even without being combined with a transmission housing. By designing the transmission housing as housing parts that are connectable with each other radially, injection-molding tools without plungers may be advantageously used for manufacturing, thereby considerably reducing the tool costs. The radial recess forms a compact, stiffly-connected interface between the electric motor and any housing parts, and is therefore particularly well-suited for use as a universal connection for a basic motor. A system of this type also makes it easier to disassemble a drive unit of this type for purposes of repair or recycling.

Depending on the method used to manufacture the pole housing, the radial recess may be formed in one end of the jacket of the pole housing, or in the bearing cover thereof. When separate punched parts are used, e.g., for the bearing cover and the jacket, the radial recesses may be punched out—very favorably—before the pole housing is assembled.

When the pole housing is manufactured using a deep-drawing process, the bearing cover may be integrally formed very easily as a single piece on the end face of the jacket. As a result, a pole pot that is closed on one side may be manufactured in one working step, with an opening being left for the armature shaft that extends out of the pole pot. By forming the bearing cover as a single piece with the jacket of the pole housing, the calotte bearing and, therefore, the armature shaft may be located very exactly in the center inside the pole pot, thereby reducing the assembly tolerances between the armature and the permanent magnet.

By installing both bearing covers on the pole housing, the electric motor may also be used without a transmission, as a standalone assembly. Via the opening in the bearing cover, an effective interface for the power transfer is provided. The armature shaft extends through the opening and out of the pole housing, to drive an adjusting device using a driven element. As an alternative, a drive shaft of the adjusting device engages—through the opening—with the armature shaft in a form-fit manner in order to couple force. The armature shaft does not extend out of the pole housing.

It is particularly favorable to design the radial recess as an opening in the pole housing wall, since this allows material to be cut out. This weight of the electric motor is reduced as a result. The opening may punched out during the deep-drawing process of the pole pot, which is very cost-favorable and easy to handle in terms of process engineering.

As an alternative, a radial recess of this type may be created using plastic cold reforming by easily impressing a certain wall section using a stamping tool. Advantageously, no waste is produced in this process, material is not cut out, and is only deformed. The dimensional stability of the radial recesses is increased as a result.

When the outer diameter is smaller in the region of the radial recess than the outer diameter of the rest of the essentially cylindrical pole housing, the diameter of the corresponding fastening segments of the transmission interface may also be made smaller, so that the outer diameter of the transmission housing does not extend beyond the diameter of the pole housing at the connection point. In this manner, the installation space of the transmission housing may be reduced in the connection region.

To secure the electric motor against turning in the transmission housing or in the fastening flange, regions of the pole housing are left non-deformed between the radial recess, so that they may form a stop for the fastening segments in the circumferential direction. No additional fabrication outlay is required to achieve this.

When the radial recesses are formed on the pole pot in diametrically opposed positions, so that radial, diametrically opposed segments engage therein, the electric motor is fixedly secured at the transmission interface evenly around the entire circumference.

To create a magnetic return between the permanent magnets, a second pole tube may be located around the pole housing jacket, which completely encloses the pole housing jacket.

To unambiguously fix the electric motor in position relative to the transmission housing and the fastening flange, a centering neck is integrally formed with the bearing cover, which centers the electric motor radially when it engages in a corresponding counter-recess. The region of the bearing cover, which accommodates, e.g., a calotte bearing, a roller bearing, or a bearing retaining spring in the interior, may be designed cylindrical in shape in the axial direction, to enable centering to take place concentrically with the armature shaft.

In a further embodiment of the electric motor, axial recesses are integrally formed in the pole housing in addition to the radial recesses, into which the fastening segments of the transmission interface may be inserted axially, to attach the electric motor. The axial recesses are formed as single pieces with the radial recesses in the pole housing, so that they form, e.g., an L-shaped recess for a bayonet connection. In the case of a customer's fully-assembled transmission housing, this makes it possible to easily install the electric motor axially without opening the transmission housing or without the need to use additional connection means, such as screws or rivets.

Advantageously, the entire transmission drive unit may be installed radially by inserting the electric motor radially into a portion of the transmission housing. At least one fastening segment of the transmission housing engages in the at least one radial recess in the pole housing. By closing the transmission housing with a radially installable cover or a half shell, the electric motor is permanently secured against moving relative to the transmission housing, while the transmission housing is closed at the same time.

By using a transmission housing made of half shells, all components of the drive unit, including the electric motor, may be installed in the same radial direction, thereby enabling the assembly line to be markedly simpler in design.

It is particularly favorable when at least two and preferably four fastening segments are integrally formed with the transmission housing (main body and cover), since this may prevent the electric motor from tipping in all four directions—which are perpendicular to each other—transversely to the armature shaft.

If the fastening segments on the transmission interface are formed via axial holders as bayonet elements that engage in the corresponding, axial and radial—and L-shaped, in particular—recesses of the pole housing, the electric motor may be very easily attached to a customer's fully-assembled transmission housing.

If an electric motor having the exact same design is to be attached at various transmission interfaces, the adapter element includes fastening segments, which are designed, e.g., as clip elements or bayonet segments that engage in the radial recesses of the pole housing. As a result, a universal basic motor may be secured in a transmission housing and in any fastening flange without the need to change the design of the electric motor. The adapter element therefore practically forms the interface between the electric motor and any type of adjustment mechanism (transmission interface).

The inventive assembly method enables a standard motor to be attached to a customer-specific transmission in an extremely simple manner while using an extremely small amount of installation space. The motor may be slid on axially and then rotated relative to the transmission, in order to fix the motor in position axially. In addition, a locking device may be used to secure the bayonet connection against the motor coming loose during operation.

BRIEF DESCRIPTION OF THE DRAWINGS

Exemplary embodiments of the inventive device are presented in the drawing and are described in greater detail in the description below.

DESCRIPTION OF THE PREFERRED EMBODIMENTS

Figure 1:
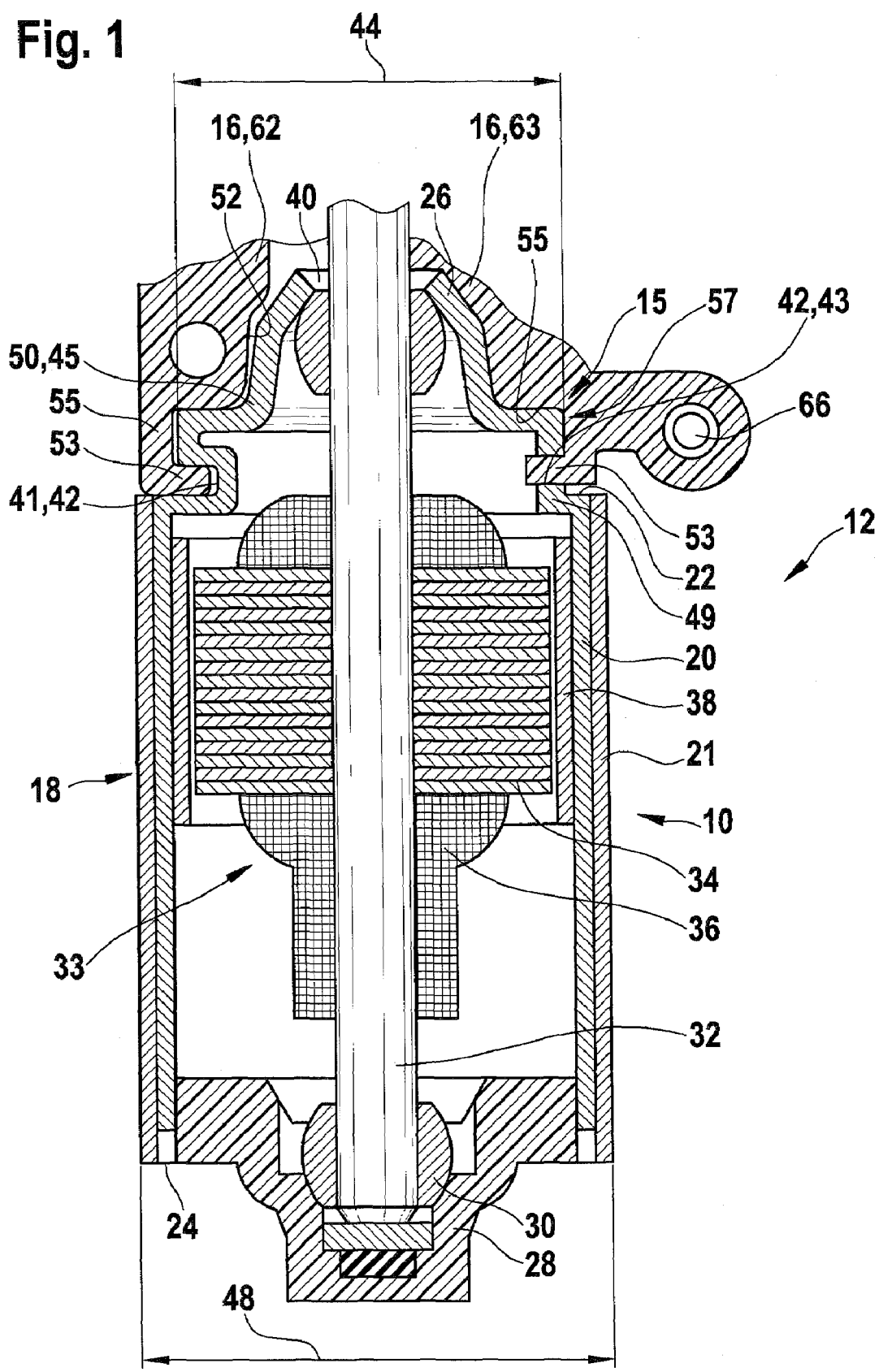
FIG. 1 shows a transmission drive unit, in a cross section.

A transmission drive unit 12 is shown in FIG. 1, with which a separate electric motor 10 is connected with a partially-shown transmission interface 15 that is designed as transmission housing 16. Electric motor 10 includes a pole housing 18 with a pole housing jacket 20 and bearing covers 26, 28 integrally formed with its end faces 22, 24. Bearing covers 26, 28 accommodate bearings 30—which are designed as sliding bearings and, in particular, as calotte bearings in the exemplary embodiment—in which an armature 33 is supported via an armature shaft 32. An armature stack 34 with electrical windings 36 is located on armature shaft 32. Electrical windings 36 interact with permanent magnets 38 located on pole housing jacket 20. Armature shaft 32 passes through bearing cover 26 on end face 22 via a hole 40 located therein in the axial direction. Armature shaft 32 extends—with a not-shown driven element—into transmission element 16, in order to provide a drive torque for movable parts in a motor vehicle using a not-shown transmission, e.g., a worm gear. In the exemplary embodiment, pole housing 18 is manufactured by deep-drawing a metal sheet. Jacket 20 is formed as one piece with bearing cover 26. Armature 33 is installed in pole housing 18 and is slid with armature shaft 32 through opening 40, then separate bearing cover 28 is installed. For certain applications, a second pole housing wall 21—as flux return ring 21—is also located on jacket 20. A radial recess 42 is located in the region of bearing cover 26, which, in the right half of the illustration, is formed as a punched-out opening 43 in pole housing wall 49. In the left half of the illustration, radial recess 42 is impressed into housing wall 49 via plastic material deformation 41. No material waste is produced in the manufacturing process. Radial recesses 42 are located in a region 57 of pole housing 18, outer diameter 44 of which is ideally smaller than outer diameter 48 of pole housing jacket 20. Region 45 of bearing cover 26 is designed as centering neck 50, which, in the installed state, engages in a corresponding counter-recess 52 of transmission housing 16. To attach electric motor 10 to transmission housing 16, fastening segments 53 of transmission housing 16 engage in radial recesses 42 of pole housing 18. Fastening segments 53 bear axially against the boundary of radial recess 42. Electric motor 10 is therefore fixed in position axially in transmission housing 16. Electric motor 10 is inserted, e.g., radially, in a first half shell 62 of transmission housing 16, so that at least one fastening segment 53 engages in at least one radial recess 42. After electric motor 10 is inserted into first half shell 62 and the not-shown transmission is installed, a second half shell 63 is installed radially to armature shaft 32 onto first half shell 62, and they are connected with each other using connecting elements 66, which engage in recesses of the two transmission housing parts 62, 63. In FIG. 1, at least one further fastening segment 53 of second half shell 63 engages in at least one further radial recess 42 of pole housing 18. Fastening segments 53 or radial recesses 42 do not include receptacles for connecting elements between electric motor 10 and transmission housing 16. Electric motor 10 is therefore securely connected with a housing main body 63 solely via the connection of transmission housing parts 62 and 63, and/or a cover 62.

Figure 2:
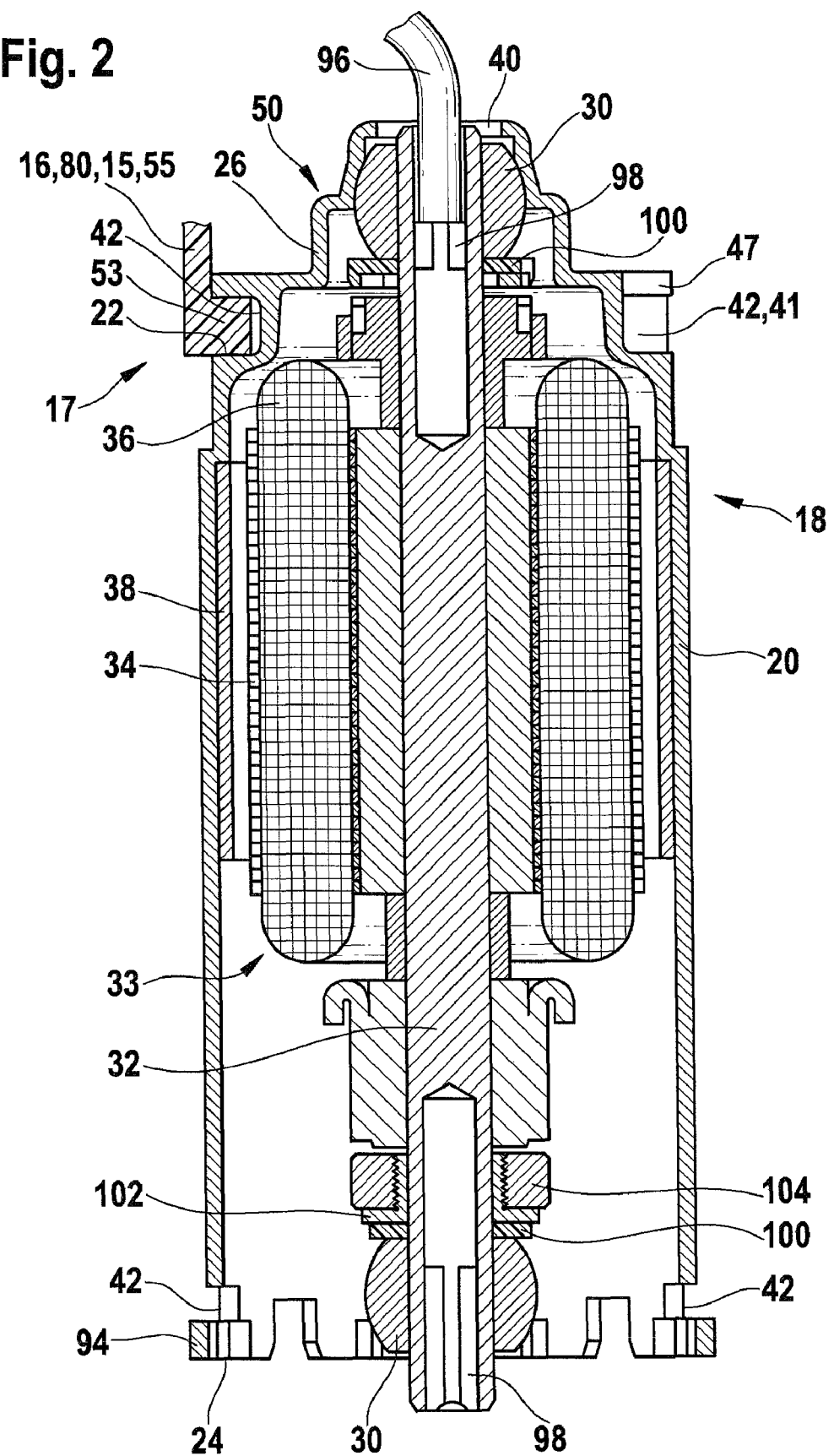
FIG. 2 shows a cross section through a further exemplary embodiment, with a bayonet connection.

The electric motor shown in FIG. 2 includes a type of bayonet connection as the mechanical interface for connection with transmission housing 16 or transmission interface 15. To this end, an axial recess 47 is formed in radial recess 42, in which fastening segment 53—which is connected to transmission interface 15 via an axial holder 55—is capable of being guided axially into the pole housing. During installation, electric motor 10 is slid axially into corresponding interface 15, and then, in the manner of a bayonet connection, it is rotated by a certain angle and, optionally, snapped into position. With this type of connection, housing 16 need not include at least two radially connectable half shells. Instead, it may be designed as a bayonet connection. Radial recess 42 is impressed directly into jacket 20 via plastic deformation, although it may be formed via material removal, e.g., punching out. Radial recesses 42 are formed on the end of pole housing 18 on which bearing cover 26 is formed as one piece. As an alternative, radial recesses 42 may be integrally formed with the other end, which is closable using a separate bearing cover 28 to assemble electric motor 10. To this end, jacket 20 includes flexible fastening tabs 94, which are formed around projections of bearing cover 28. Armature shaft 32 extends substantially along the length of pole housing 18, so that, for force coupling, a coupling element 96 (e.g., a flex shaft 96) extends through opening 40 in bearing cover 26 into an inner polyhedron 98 (e.g., a rectangle 98) of armature shaft 32. As an option, a torque pick-off of this type may be provided on one or both sides 22, 24 of pole housing 18. Thrust washers 100—which are preferably made of plastic—are located between bearings 30 and armature 33. Armature shaft 32 bears axially against bearings 30 via thrust washers 100. Thrust washers 100 are non-rotatably connected with armature shaft 32 and/or with armature components 102 located thereon, such as receiving sleeve 102 for an annular magnet 104.

Figure 3:
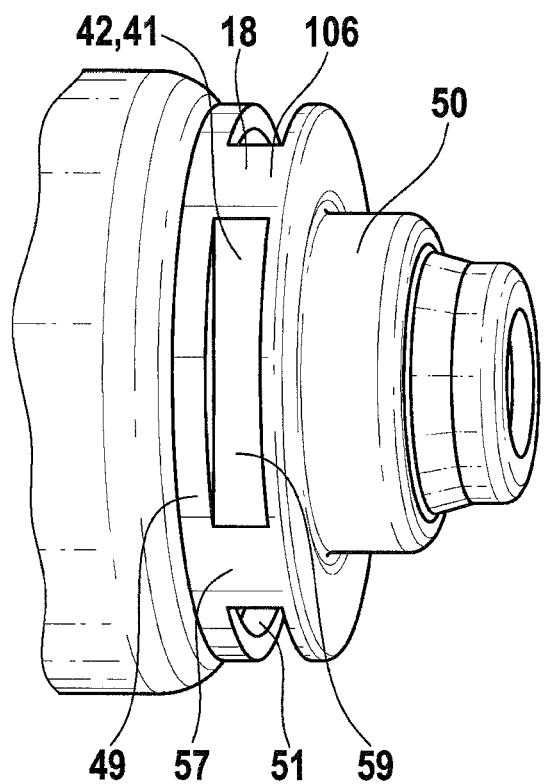
FIGS. 3 and 4 show views of two further inventive electric motors.

FIG. 3 shows a section of a further electric motor 10, with which radial recesses 42 are impressed into the wall of pole housing 18 via plastic cold deformation 41. The material of pole housing 49 is merely impressed inward, and is not cut out, so an opening in wall 49 is not created. In one variant, wall 49 is deformed to such an extent that an opening (slot 51) forms in the pole housing. Pressed-in wall region 59 is designed as a flat surface, against which fastening segments 53 bear after installation in transmission interface 15. As an alternative, wall region 59 is arched inward into pole housing 18. In the embodiment shown in FIG. 3, no axial recesses 47 are formed in pole pot 18, since electric motor 10 is designed to be installed radially into a transmission housing 16 with a cover, and/or with two half shells 62, 63.

Figure 4:
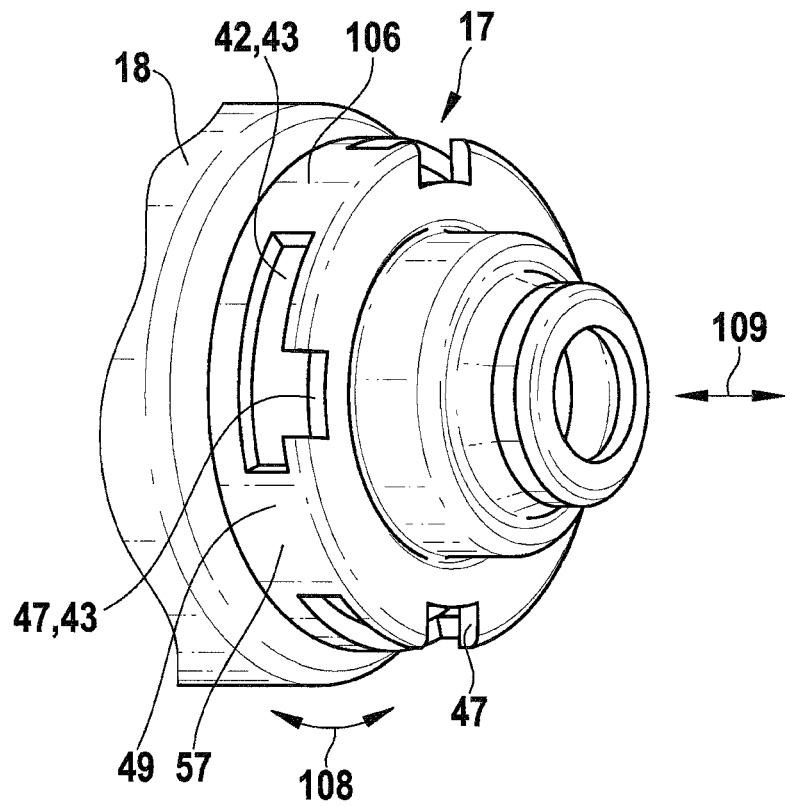

FIG. 4 shows a further exemplary embodiment, with which radial recesses 42 are designed as openings 43 in pole housing wall 49. They are formed, e.g., by punching a deep-drawn metal sheet of pole housing 18. In addition to radial recesses 42, axial recesses 48 are also formed in axial direction 109, which—together with radial recesses 43—form a common opening 43, which is, e.g., L-shaped. In a not-shown variant of the embodiment, axial recesses 47 are formed via plastic deformation, so that they are impressed into housing wall 49 together with radial recesses 42. Axial recesses 47 are suited for axial installation 109 of electric motor 10 in transmission interface 15, in particular for a bayonet connection 17. Fastening segments 53 are inserted axially into axial recesses 47, then electric motor 10 is rotated in circumferential direction 108. Fastening segments 53 are pushed into radial recesses 42 in circumferential direction 108 and fix electric motor 10 into position, at least in the axial direction. A locking device may be also provided, which prevents electric motor 10 from accidentally rotating in reverse in circumferential direction 108 when in the installed state.

Figure 5:
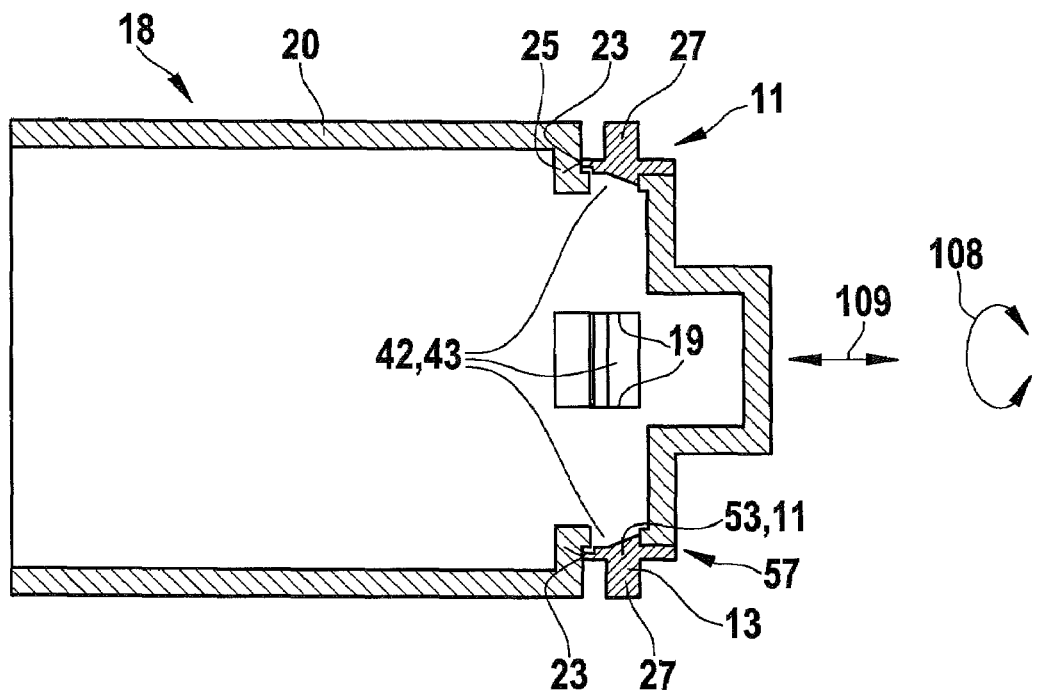
FIG. 5 shows a cross section through a further exemplary embodiment, with an adapter element.

A further exemplary embodiment of a transmission drive unit 12 is shown in FIG. 5, with which electric motor 10 is not connected directly in transmission housing 16, but is connected with an adapter element 13. Adapter element 13 also includes fastening segments 53, which engage in radial recesses 42 of pole housing 18. Fastening segments 53 are designed, e.g., as snap-in connection 11. When adapter element 13 is slid onto pole housing 18 in axial direction 109, fastening segments 53 slide over housing 18 until they snap into radial recesses 42 in a form-fit manner and fixedly connect adapter element with pole housing 18. Adapter element 13 is braced axially via a seat 23 against a collar 25 of the pole housing, and is braced with fastening segment 53 in radial recess 42. Radial recesses 42 also form a stop 19 for fastening segments 53 in circumferential direction 108, so that adapter element 13 is also secured against rotation. Adapter element 13 includes radial projections 27 around its outer circumference, with which adapter element 13 is connectable with a transmission interface 15, in particular via radial recesses formed therein. Using adapter element 13, the position of radial recesses 42 in pole housing 18 and fastening segments 53 on transmission interface 15 may be interchanged.

Figure 6:
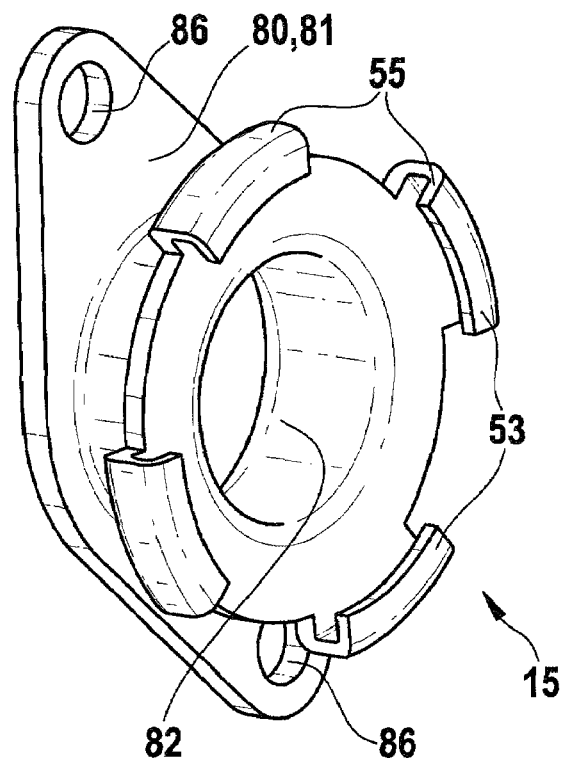
FIG. 6 shows a transmission interface formed as a fastening flange.

FIG. 6 shows a transmission interface 15, which is designed as fastening flange 80, which is connectable with a transmission drive unit 12 and/or an electric motor 10, according to the present invention. Fastening flange 80 includes receptacles 86 for connecting means for attachment to a body part 15. Fastening flange 80 is designed as one-piece bent blank 81 and includes radial fastening segments 53, which are connected with fastening flange 80 via axial holders 55. A hole 82 is located inside fastening segments 53 in the center, in which output shaft 32, 96 and/or centering neck 50 of transmission drive unit 12 may engage. Fastening flange 80 is slid on axially in the manner of a bayonet, and radial fastening segments 53 of fastening flange 80 engage in axial recesses 47 of pole housing 18. Fastening flange 80 is then rotated in circumferential direction 108 relative to pole housing 18, so that radial fastening segments 53 are pushed into radial recesses 42, which are formed in pole housing 18 as wall openings 43 or via plastic deformation 41.

It should be noted that, with regard for the exemplary embodiments presented in the figures and the description, many different combinations of the individual features are possible. For example, the specific embodiment of radial recess 42, and its position in pole housing 18 may be varied depending on the method used to manufacture it. In addition, fastening segments 53 may have any shape, for combination with a transmission housing 16 or an adapter element 13. The design of armature 33, transmission housing 16, and the transmission may reflect any known application. The special feature of the present invention lies in the fact that an identical electric motor 10 is used as basic motor 10 for a modular principle for combination with various transmission interfaces 15, such as transmission housing 16, fastening flange 80, or adapter 13, without the need for separate connecting means for connection with adjacent transmission interface 15. Inventive electric motor 10 and/or transmission drive unit 12 are/is preferably used for seat adjusting devices in a motor vehicle, although they/it may also be used for any other type of actuator.

What is claimed is:

1. An electric motor (10) for actuators in a motor vehicle, with an armature shaft (32), which is supported in a pole housing (18) that includes a jacket (20) and a bearing cover (26, 28) on at least on one end face (22, 24) for accommodating a bearing (30) for the armature shaft (32),
wherein at least one radial recess (42) is formed in the pole housing (18) and configured to be engaged, once the pole housing (18) has been fully assembled, by at least one inwardly protruding radial fastening segment (53) of a transmission interface (15) in the pole housing (18), and to attach the electric motor (10) to the transmission interface (15),
wherein upon radially inserting the electric motor (10) into a portion of a transmission housing (16), the inwardly protruding radial fastening segment (53) of the transmission housing (16) engages in the at least one radial recess in the pole housing (18) thereby attaching the electric motor (10) to the transmission interface (15), and
wherein the at least one radial recess (42) is created using plastic cold reforming by impressing a wall section with a stamping tool.

2. The electric motor (10) as recited in claim 1, wherein the radial recess (42) is integrally formed in the bearing cover (26) or the jacket (20) of the pole housing (18).

3. The electric motor (10) as recited in claim 1, wherein the bearing cover (26) is made of metal and is formed as one piece with the jacket (20) of the pole housing (18).

4. The electric motor (10) as recited in claim 1, wherein the bearing cover (26) includes a central opening (40) through which the armature shaft (32) or a transmission shaft (96) engaged with the armature shaft (32) extends.

5. The electric motor (10) as recited in claim 1, wherein the radial recess (42) is formed as a wall opening (43) in the pole housing (18).

6. The electric motor (10) as recited in claim 1, wherein the radial recess (42) is located in a region (57) of the pole housing (18) that has a smaller outer diameter (44) than the outer diameter (48) of the pole housing jacket (20, 21).

7. An electric motor (10) for actuators in a motor vehicle, with an armature shaft (32), which is supported in a pole housing (18) that includes a jacket (20) and a bearing cover (26, 28) on at least on one end face (22, 24) for accommodating a bearing (30) for the armature shaft (32),
wherein at least one radial recess (42) is formed in the pole housing (18) and configured to be engaged, once the pole housing (18) has been fully assembled, by inwardly protruding radial fastening segments (53) of a transmission interface (15) in the pole housing (18), and to attach the electric motor (10) to the transmission interface (15),
wherein upon radially inserting the electric motor (10) into a portion of a transmission housing (16), the inwardly protruding fastening segments (53) of the transmission housing (16) engage in radial recesses (42) in the pole housing (18) thereby attaching the electric motor (10) to the transmission interface (15),
wherein circular arc-shaped regions (106) of the pole housing (18) are located between the radial recesses (42) in the pole housing (18) in the circumferential direction, and
wherein the regions of the pole housing (18) between the radial recesses (42) are left non-deformed so that they form a stop for the inwardly protruding radial fastening segments (53) in a circumferential direction.

8. The electric motor (10) as recited in claim 1, wherein the radial recesses (42) are diametrically opposed to each other in the radial direction.

9. The electric motor (10) as recited in claim 1, wherein the pole housing jacket (20) has a double-walled design.

10. The electric motor (10) as recited in claim 1, wherein the bearing cover (26) includes an axial centering neck (50) for engaging in a corresponding counter-recess (52) of the transmission recess (15) or a transmission housing (16).

11. The electric motor (10) as recited in claim 1, wherein, in addition to the radial recesses (42), axial recesses (47) are formed in the pole housing (18), into which the inwardly protruding radial fastening segments (53) of the transmission interface (15) are inserted in the axial direction (109).

12. A transmission drive unit (12) with an electric motor (10) as recited in claim 1, and a transmission housing (16),
wherein the transmission housing (16) includes at least one radial fastening segment (53) for engaging in the radial recess (42).

13. The transmission drive unit (12) as recited in claim 12, characterized by at least two housing shells (62, 63), which are capable of being joined radially.

14. The transmission drive unit (12) as recited in claim 12, wherein the transmission housing (16) includes at least two, and four, in particular, fastening segments (53), which are connected with the transmission housing (16) using axial holding elements (55).

15. The transmission drive unit (12) as recited in claim 12, wherein the electric motor (10) and the transmission interface (15) and/or the transmission housing (16) are/is connected via a bayonet connection (17), which is formed by the radial recess (42, 41, 43) and the fastening segments (53) engaged therein.

16. The electric motor (10) as recited in claim 1, with an adapter element (13) that engages via inwardly protruding radial fastening segment (53) in the recesses (42) of the pole housing (18), the adapter element (13) including radial and/or axial projections (27) which are engageable in counter-recesses of a transmission interface (15, 16).

17. A method for connecting an electric motor (12) with a transmission interface (15, 16, 80, 13), in particular as recited in claim 1, characterized by the following steps:
Insert the electric motor (10) into the transmission interface (15, 16, 80, 13) in the axial direction (109) and center it in a counter-recess (52) of the transmission interface (15) using a centering neck (50),
Insert fastening segments (53) of the transmission interface (15) axially into axial recesses (47) of the pole housing (18),
Rotate the electric motor (10) in the circumferential direction (108) relative to the transmission interface (15); the fastening segments (53) engage in radial recesses (42) in the pole housing (18) to fix the electric motor (10) in position on the transmission interface (15).

18. The electric motor (10) as recited in claim 3, wherein the bearing cover (26) is configured as a deep-drawn cover.

19. The electric motor (10) as defined in claim 4, wherein the transmission shaft (96) is configured as a flex shaft.

20. The electric motor (10) as defined in claim 5, wherein the radial recess (42) is formed as a recess punched-out of the pole housing (18).

21. An electric motor (10) for actuators in a motor vehicle, with an armature shaft (32), which is supported in a pole housing (18) that includes a jacket (20) and a bearing cover (26, 28) on at least on one end face (22, 24) for accommodating a bearing (30) for the armature shaft (32), wherein at least one radial recess (42) is formed in the pole housing (18) and configured to be engaged, once the pole housing (18) has been fully assembled, by at least one inwardly protruding radial fastening segment (53) of a transmission interface (15) in the pole housing (18), and to attach the electric motor (10) to the transmission interface (15), wherein upon radially inserting the electric motor (10) into a portion of a transmission housing (16), the at least one inwardly protruding fastening segment (53) of the transmission housing (16) engages in at least one radial recess in the pole housing (18), and wherein the inwardly protruding fastening segments (53) so engaged bear axially against a boundary of the radial recess (42), and the electric motor (10) is therefore fixed in position axially in the transmission housing (16).

22. An electric motor (10) for actuators in a motor vehicle, with an armature shaft (32), which is supported in a pole housing (18) that includes a jacket (20) and a bearing cover (26, 28) on at least on one end face (22, 24) for accommodating a bearing (30) for the armature shaft (32), wherein at least one radial recess (42) is formed in the pole housing (18) and configured to be engaged, once the pole housing (18) has been fully assembled, by at least one inwardly protruding radial fastening segment (53) of a transmission interface (15) in the pole housing (18), and to attach the electric motor (10) to the transmission interface (15), wherein upon radially inserting the electric motor (10) into a portion of a transmission housing (16), the at least one inwardly protruding radial fastening segment of the transmission housing (16) engages in at least one radial recess in the pole housing (18, wherein pressed-in wall regions (59) are formed as a flat surface, against which the inwardly protruding fastening segments (53) bear after installation in the transmission interface (15) attaching the electric motor (10) thereto.

* * * * *